(12) United States Patent
Cheng et al.

(10) Patent No.: US 8,879,531 B2
(45) Date of Patent: Nov. 4, 2014

(54) MOBILE ROUTER CAPABLE OF AUTOMATICALLY DETECTING NETWORK CONNECTION MODE AND PERFORMING NETWORK CONNECTION SETTING, AND METHOD THEREOF

(71) Applicant: D-Link Corporation, Taipei (TW)

(72) Inventors: Hsiu-Ju Cheng, Taipei (TW); Ming-Han Liu, Taipei (TW)

(73) Assignee: D-Link Corporation, Taipei (TW)

( * ) Notice: Subject to any disclaimer, the term of this patent is extended or adjusted under 35 U.S.C. 154(b) by 63 days.

(21) Appl. No.: 13/784,994

(22) Filed: Mar. 5, 2013

(65) Prior Publication Data

US 2014/0185600 A1    Jul. 3, 2014

(30) Foreign Application Priority Data

Jan. 3, 2013  (TW) .............................. 102100111 A (51) Int. Cl.
*H04W 4/00* (2009.01)
*H04H 20/71* (2008.01)
*H04L 12/28* (2006.01)
*H04L 12/931* (2013.01)

(52) U.S. Cl.
CPC ...................................... *H04L 49/35* (2013.01)
USPC ........... 370/338; 370/328; 370/331; 370/351; 370/315

(58) Field of Classification Search
USPC ......................................................... 370/338
See application file for complete search history.

(56) References Cited

U.S. PATENT DOCUMENTS

| | | | |
|---|---|---|---|
| 2005/0111346 A1* | 5/2005 | Santhoff et al. ............... | 370/315 |
| 2006/0039338 A1* | 2/2006 | Kwon et al. ................... | 370/338 |
| 2006/0123129 A1* | 6/2006 | Toebes et al. ................. | 709/230 |
| 2008/0218309 A1* | 9/2008 | Steenstra et al. .............. | 340/5.8 |
| 2009/0138631 A1* | 5/2009 | Hung ............................. | 710/48 |
| 2009/0323632 A1* | 12/2009 | Nix ............................... | 370/331 |
| 2011/0029605 A1* | 2/2011 | Barker ......................... | 709/203 |
| 2011/0280175 A1* | 11/2011 | Yamada et al. ............... | 370/315 |
| 2012/0151022 A1* | 6/2012 | Ayyagari et al. ............. | 709/222 |

* cited by examiner

*Primary Examiner* — Jenee Williams
(74) *Attorney, Agent, or Firm* — Bacon & Thomas, PLLC (57) ABSTRACT

The present invention is to provide a mobile router, which can connect with a network transmission device capable of wired or wireless networking (e.g., a modem provided by a network service provider, a wireless LAN access point, or a mobile communication access point) in a corresponding one of at least three network connection modes based on a wired Ethernet, a wireless Local Area Network and a wireless Wide Area Network, so as to transmit a network packet from a terminal device (e.g., a desktop computer, a laptop computer, or a mobile phone) to the Internet or vice versa through the network transmission device. The mobile router can automatically detect an applicable network connection mode and automatically apply network connection settings stored in a corresponding profile. If no such corresponding profile exists, the mobile router can automatically store the network connection settings manually input by the user as a profile.

6 Claims, 4 Drawing Sheets

MOBILE ROUTER CAPABLE OF AUTOMATICALLY DETECTING NETWORK CONNECTION MODE AND PERFORMING NETWORK CONNECTION SETTING, AND METHOD THEREOF

FIELD OF THE INVENTION

The present invention relates to a router, more particularly to a mobile router which can connect with a network transmission device capable of wired or wireless networking in a corresponding one of at least three network connection modes based on a wired Ethernet, a wireless Local Area Network and a wireless Wide Area Network, so as to transmit a network packet from a terminal device to the Internet or vice versa through the network transmission device. The mobile router can automatically detect an applicable network connection mode and automatically apply network connection settings stored in a corresponding profile. If no such corresponding profile exists, the mobile router can automatically store the network connection settings manually input by the user as a profile.

BACKGROUND OF THE INVENTION

A router is an apparatus for interconnection between network systems (including interconnection between Local Area Networks or Wide Area Networks) and is capable of selecting the optimal path from among all possible network paths in order to transmit data packets. Therefore, routers play a critical role in the Internet. With the development of wireless network technology, router designs have advanced from wired to wireless ones. A wireless router can transmit data to and from several terminal devices simultaneously using wireless signals.

Nowadays, due to changes in the way of life, more and more people must travel between different places, where they have to use terminal devices of various forms (e.g., desktop computers, laptop computers, or mobile phones) to log on to the Internet. One who has the above needs may buy a mobile router for receiving different kinds of wired or wireless network signals and simultaneously sharing the network signals with the terminal devices in use. Currently, some common network connection modes in Internet applications are those based respectively on a wired Ethernet (e.g., Ethernet, Fast Ethernet, or Gigabit Ethernet), a Local Area Network (LAN) (e.g., Wi-Fi, Bluetooth, DECT, or Wireless USB), and a Wide Area Network (WAN) (e.g., GPRS, EDGE, 3GPP, 4G-LTE, or WiMAX). The wired Ethernet connection mode further includes such protocols as the Point-to-Point Protocol over Ethernet (PPPoE) and the Dynamic Host Configuration Protocol (DHCP).

In order for a mobile router to connect to the Internet through a network transmission device capable of wired or wireless networking (e.g., a modem provided by a network service provider, a LAN server, or a wireless signal access point) and thereby enable different terminal devices to log on to the Internet via the mobile router, a connection must first be established between the mobile router and the network transmission device, and the network connection settings of the connection must be set according to the network connection mode and the type of protocol between the mobile router and the network transmission device; otherwise, the mobile router cannot connect to the Internet. Therefore, if the mobile router is frequently taken to different places where the networking environments provided (including the network connection modes and the protocols to be used) vary, it is necessary to change the network connection settings manually each time the mobile router is moved to a different networking environment.

As the parameters required to be set vary with the network connection mode in use, only those who are knowledgeable about network technology are capable of making the right settings on their own; one who is unfamiliar with such technology may find it rather difficult and complicated to simply understand the settings of each network connection mode. Consequently, it is not uncommon that, due to a lack of knowledge in networking, the user of a mobile router sets the wrong settings that prevent the mobile router from working properly. Or the user has to spend a lot of time figuring out how to set the correct settings, which causes trouble to the user, too. Moreover, as stated above, the settings are not good for all networking environments. Whenever the user takes the mobile router to a different networking environment, the settings must be reset manually even if the user travels between only two places, which is truly annoying.

According to the above, a mobile router cannot be used in different networking environments unless the user changes the network connection settings of the mobile router in response to any change in the networking environment, and the user is required to set the network connection settings of the mobile router manually each time the networking environment is changed. In a nutshell, the setting of a mobile router is extremely user-unfriendly. Hence, the issue to be addressed by the present invention is to design a mobile router which can automatically detect an applicable network connection mode and automatically self-configure for network connection, so as to provide increased convenience of use.

BRIEF SUMMARY OF THE INVENTION

In view of, and in order to overcome, the aforesaid drawbacks of the conventional mobile routers during use, the inventor of the present invention put years of practical experience in the related industry into practice, conducted extensive research and experiment, and finally succeeded, after repeated adjustments, in developing a mobile router capable of automatically detecting a network connection mode and performing network connection setting, and a method thereof.

It is an object of the present invention to provide a mobile router capable of automatically detecting a network connection mode and performing network connection setting, and a method thereof. The mobile router can connect with a network transmission device capable of wired or wireless networking (e.g., a modem provided by a network service provider, a wireless LAN access point (AP), or a mobile communication AP) in a corresponding one of at least three network connection modes, namely a network connection mode based on a wired Ethernet (e.g., Ethernet, Fast Ethernet, or Gigabit Ethernet) (hereinafter referred to as the wired Ethernet connection mode), a network connection mode based on a wireless Local Area Network (e.g., Wi-Fi, Bluetooth, DECT, or Wireless USB) (hereinafter referred to as the wireless LAN connection mode), and a network connection mode based on a wireless Wide Area Network (e.g., GPRS, EDGE, 3GPP, 4G-LTE, or WiMAX) (hereinafter referred to as the wireless WAN connection mode), so as to transmit a network packet from a terminal device (e.g., a desktop computer, a laptop computer, or a mobile phone) to the Internet or vice versa through the network transmission device. The mobile router includes an Ethernet cable connection port, a Universal Serial Bus (USB) connection port, a detection unit, a communication unit, a protocol confirmation unit, a storage unit, and a control unit. The Ethernet cable connection port is configured for connecting with an Ethernet cable so that the mobile router can connect with the network transmission device in the wired Ethernet connection mode. The USB connection port is configured for connecting with a wireless network interface card so that the mobile router can connect with the network transmission device in the wireless WAN connection mode. The detection unit is configured for separately detecting the connection state of the Ethernet cable connection port and of the USB connection port and for determining whether an Ethernet cable and/or a wireless network interface card is connected to the Ethernet cable connection port and/or the USB connection port. The communication unit enables the mobile router to connect with the network transmission device in the wired Ethernet connection mode, the wireless LAN connection mode, or the wireless WAN connection mode. When the mobile router is connected with the network transmission device in the wired Ethernet connection mode, the communication unit sends to the network transmission device a request packet requesting connection through the Point-to-Point Protocol over Ethernet (PPPoE) of the wired Ethernet connection mode and/or a request packet requesting connection through the Dynamic Host Configuration Protocol (DHCP) of the wired Ethernet connection mode. The protocol confirmation unit is configured for receiving, through the communication unit, a response packet sent by the network transmission device via the Ethernet and for determining whether the response packet confirms the connection request in the PPPoE request packet and/or the DHCP request packet. The storage unit stores a plurality of profiles, and each profile stores a set of network connection settings. The control unit can drive the detection unit to detect the Ethernet cable connection port. When the detection unit determines that an Ethernet cable is connected to the Ethernet cable connection port, the control unit drives the communication unit to send the aforesaid Ethernet connection mode request packet(s) to the network transmission device, and once the protocol confirmation unit determines that the response packet sent by the network transmission device has confirmed the request for connection through a specific protocol (e.g., the PPPoE or the DHCP) of the wired Ethernet connection mode, the control unit drives the communication unit to connect with the network transmission device through that protocol of the wired Ethernet connection mode. When the detection unit determines that there is no Ethernet cable connected to the Ethernet cable connection port, the control unit drives the detection unit to detect the USB connection port. When the detection unit determines that a wireless network interface card is connected to the USB connection port, the control unit drives the communication unit to connect with the network transmission device in the wireless WAN connection mode (e.g., the 3G mobile broadband mode). When the detection unit determines that there is no wireless network interface card connected to the USB connection port, the control unit drives the communication unit to scan for a second network transmission device which can serve as a wireless LAN (e.g., Wi-Fi wireless network) hotspot and, if such a second network transmission device is found, to connect therewith in the wireless LAN connection mode. After the communication unit establishes an ongoing connection with the network transmission device (or the second network transmission device) in any of the aforesaid network connection modes, the control unit reads the profiles stored in the storage unit and determines whether any of the profiles corresponds to the ongoing connection. If yes, the control unit applies the network connection settings in the profile to the ongoing connection, so as for the mobile router to log on to the Internet through the network transmission device (or the second network transmission device). If no, the control unit sends a setting request to the terminal device through the communication unit and receives a setting command from the terminal device, wherein the setting command is set by the user via the terminal device and sent to the mobile router. Then, the control unit applies the network connection settings in the setting command to the ongoing connection and, once the mobile router successfully logs on to the Internet through the network transmission device (or the second network transmission device), writes the network connection settings into the storage unit, where the network connection settings are stored as a profile.

Thus, when the user takes the mobile router from one networking environment to another, the mobile router can automatically detect an applicable network connection mode and establish an ongoing connection with a network transmission device in the current networking environment. If the storage unit already stores a profile corresponding to the ongoing connection, the mobile router can automatically log on to the Internet via the network transmission device, without the user having to change the settings manually. If, however, none of the profiles stored in the storage unit corresponds to the ongoing connection, the mobile router can automatically create a profile after the user changes the settings and logs the mobile router on to the Internet through the network transmission device with success. Therefore, when the mobile router is connected with the network transmission device for a second time, the mobile router can automatically log on to the Internet through the network transmission device.

Another object of the present invention is to provide a method for automatically detecting a network connection mode and performing network connection setting. The method is applicable to a mobile router which includes an Ethernet cable connection port, a USB connection port, a detection unit, a communication unit, a protocol confirmation unit, a storage unit, and a control unit. The method includes the following steps to be performed by the control unit. To begin with, the control unit drives the detection unit to detect the Ethernet cable connection port. When the detection unit determines that an Ethernet cable is connected to the Ethernet cable connection portion, the control unit drives the communication unit to send the aforesaid Ethernet connection mode request packet(s) to a network transmission device; and once the protocol confirmation unit confirms the protocol of the wired Ethernet connection mode as specified in a response packet sent from the network transmission device, the control unit drives the communication unit to connect with the network transmission device through the specified protocol of the wired Ethernet connection mode. When the detection unit determines that there is no Ethernet cable connected to the Ethernet cable connection port, the control unit drives the detection unit to detect the USB connection port. When the detection unit determines that a wireless network interface card is connected to the USB connection port, the control unit drives the communication unit to connect with the network transmission device in the wireless WAN connection mode; when the detection unit determines that there is no wireless network interface card connected to the USB connection port, the control unit drives the communication unit to scan for a second network transmission device which can serve as a wireless LAN hotspot. If such a second network transmission device is found, the control unit drives the communication unit to connect with the second network transmission device in the wireless LAN connection mode. After the communication unit establishes a connection with the network transmission device (or the second network transmission device) in any of the aforesaid network connection modes, the control unit reads profiles stored in the storage unit. If the control unit determines that there is a profile corresponding to the connection, the control unit applies the network connection settings in that profile to the connection, so as for the mobile router to log on to the Internet through the network transmission device (or the second network transmission device). If the control unit determines that there is no profile corresponding to the connection, the control unit sends a setting request to a terminal device via the communication unit, receives a setting command from the terminal device, and applies the network connection settings in the setting command to the connection. When the mobile router successfully logs on to the Internet via the network transmission device (or the second network transmission device), the control unit writes and stores the network connection settings into the storage unit as a profile.

With the method described above, the mobile router can automatically detect an applicable network connection mode and automatically apply the network connection settings in the corresponding profile. If no such corresponding profile exists, the mobile router can automatically store the network connection settings manually input by the user as a profile.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
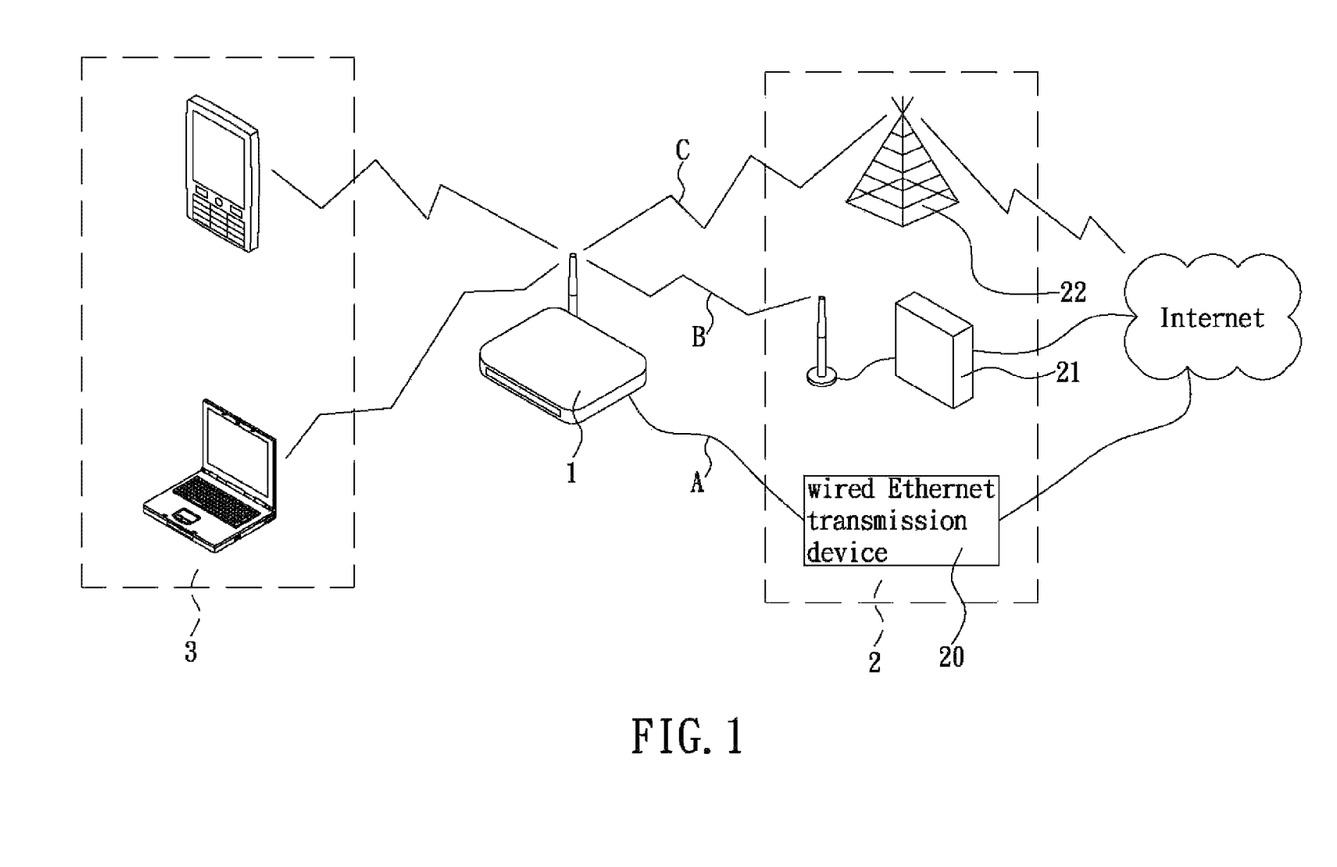
FIG. 1 is a schematic network diagram showing how the present invention is applied to a network system.

The present invention discloses a mobile router capable of automatically detecting a network connection mode and performing network connection setting, and a method thereof. Referring to FIG. 1, a mobile router 1 can connect with a network transmission device 2 capable of wired or wireless networking, such as a wired Ethernet transmission device 20 (e.g., a modem provided by a network service provider), a wireless LAN transmission device 21 (e.g., a wireless LAN AP), or a wireless WAN transmission device 22 (e.g., a mobile communication access point), in a corresponding one of at least a network connection mode based on a wired Ethernet A (e.g., Ethernet, Fast Ethernet, or Gigabit Ethernet) (hereinafter also referred to as the wired Ethernet connection mode), a network connection mode based on a wireless LAN B (e.g., Wi-Fi, Bluetooth, DECT, or Wireless USB) (hereinafter also referred to as the wireless LAN connection mode), and a network connection mode based on a wireless WAN C (e.g., GPRS, EDGE, 3GPP, 4G-LTE, or WiMAX) (hereinafter also referred to as the wireless WAN connection mode). The mobile router 1 can also transmit a network packet from a terminal device 3 (e.g., a desktop computer, a laptop computer, or a mobile phone) to the Internet or vice versa through the network transmission device 2.

Figure 2:
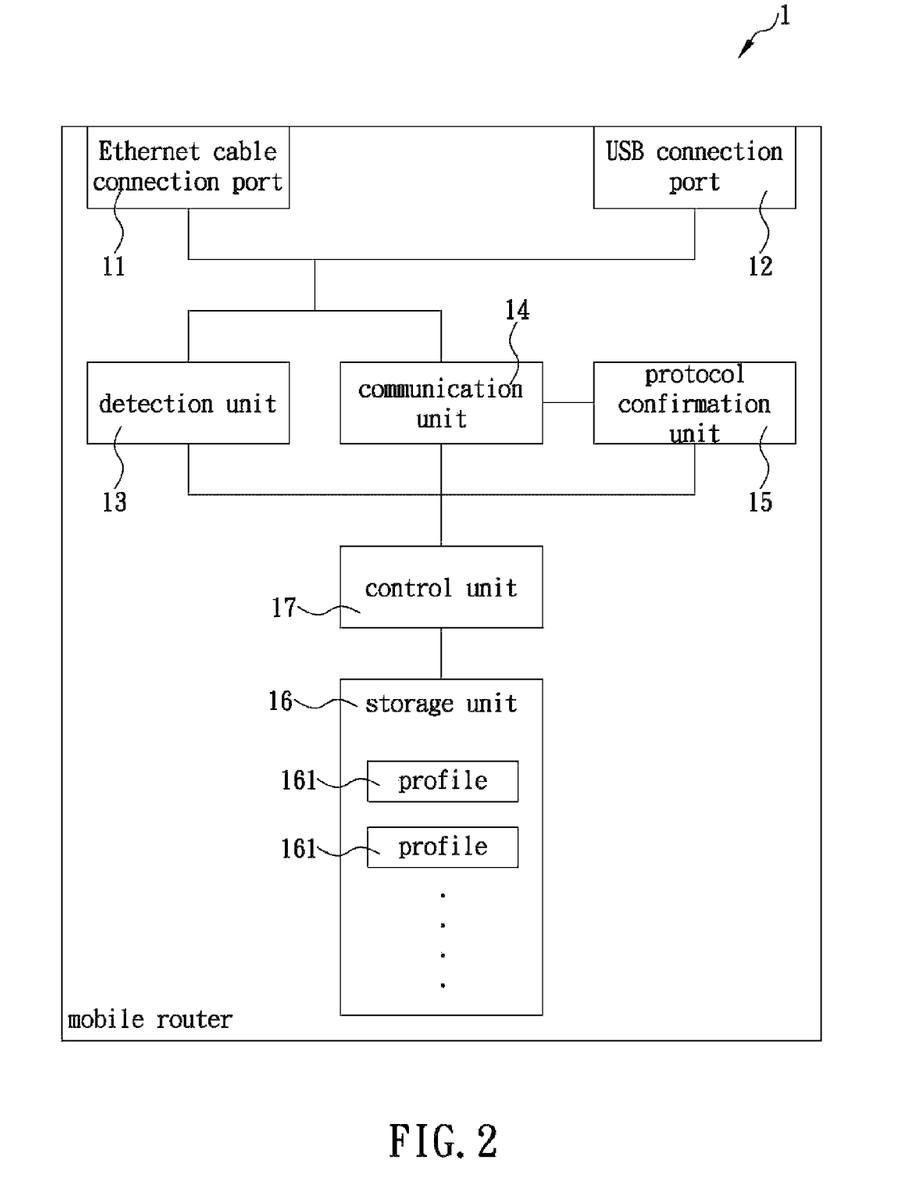
FIG. 2 is a block diagram of the elements of a mobile router according to the present invention.

Referring to FIG. 2, in a preferred embodiment of the present invention, the mobile router 1 includes an Ethernet cable connection port 11, a USB connection port 12, a detection unit 13, a communication unit 14, a protocol confirmation unit 15, a storage unit 16, and a control unit 17. The Ethernet cable connection port 11 is configured for connecting with an Ethernet cable (not shown) and thereby enabling the mobile router 1 to connect with the network transmission device 2 (see FIG. 1) in the wired Ethernet connection mode. The USB connection port 12 is configured for connecting with a wireless network interface card (not shown) and thereby enabling the mobile router 1 to connect with the network transmission device 2 in the wireless WAN connection mode. The detection unit 13 can separately detect the connection state of the Ethernet cable connection port 11 and of the USB connection port 12 and determine whether an Ethernet cable and/or a wireless network interface card is connected to the Ethernet cable connection port 11 and/or the USB connection port 12. The communication unit 14 enables the mobile router 1 to connect with the network transmission device 2 either through the Ethernet A or the wireless WAN C or directly through the wireless LAN B, as appropriate. When the mobile router 1 is connected with the network transmission device 2 in the network connection mode based on the wired Ethernet A, the communication unit 14 sends to the network transmission device 2 a request packet requesting connection through the Point-to-Point Protocol over Ethernet (PPPoE) of the wired Ethernet connection mode and/or a request packet requesting connection through the Dynamic Host Configuration Protocol (DHCP) of the wired Ethernet connection mode. The network transmission device 2 sends out a response packet through the Ethernet A, and the protocol confirmation unit 15, upon receiving the response packet through the communication unit 14, determines whether the response packet confirms the connection request in the PPPoE request packet and/or the DHCP request packet. The storage unit 16 stores a plurality of profiles 161, wherein each profile 161 stores a set of network connection settings. The control unit 17 can drive the detection unit 13 to detect the Ethernet cable connection port 11. When the detection unit 13 determines that an Ethernet cable is connected to the Ethernet cable connection port 11, the control unit 17 drives the communication unit 14 to send the aforesaid Ethernet connection mode request packet(s) to the network transmission device 2, and once the protocol confirmation unit 15 determines that the response packet sent by the network transmission device 2 has confirmed the request for connection through a specific protocol (e.g., the PPPoE or the DHCP) of the wired Ethernet connection mode, the control unit 17 drives the communication unit 14 to connect with the network transmission device 2 through the specific protocol of the wired Ethernet connection mode. When the detection unit 13 determines that there is no Ethernet cable connected to the Ethernet cable connection port 11, the control unit 17 drives the detection unit 13 to detect the USB connection port 12. When the detection unit 13 determines that a wireless network interface card is connected to the USB connection port 12, the control unit 17 drives the communication unit 14 to connect with the network transmission device 2 in the network connection mode based on the wireless WAN C (e.g., the 3G mobile broadband mode). When the detection unit 13 determines that there is no wireless network interface card connected to the USB connection port 12, the control unit 17 drives the communication unit 14 to scan directly for the wireless LAN transmission device 21, which can function as a hotspot in the wireless LAN B (e.g., a Wi-Fi wireless network), and to connect with the wireless LAN transmission device 21 in the network connection mode based on the wireless LAN B. After the communication unit 14 establishes an ongoing connection with the network transmission device 2 in one of the aforesaid network connection modes, the control unit 17 reads the profiles 161 stored in the storage unit 16 and determines whether any of the profiles 161 corresponds to the ongoing connection. If yes, the control unit 17 applies the network connection settings in the profile 161 to the ongoing connection, so as for the mobile router 1 to log on to the Internet via the network transmission device 2. If no, the control unit 17 sends a setting request to the terminal device 3 (see FIG. 1) through the communication unit 14 and receives a setting command from the terminal device 3, wherein the setting command is set by the user through the terminal device 3 and sent to the mobile router 1. Then, the control unit 17 applies the new network connection settings in the setting command to the ongoing connection. Once the mobile router 1 successfully logs on to the Internet through the network transmission device 2, the control unit 17 writes the new network connection settings into the storage unit 16, wherein the new network connection settings are stored as a profile 161.

Thus, when the user carries the mobile router 1 from a first networking environment to a second networking environment, the mobile router 1 can automatically detects an applicable network connection mode and establishes an ongoing connection with a network transmission device 2 in the second networking environment. If the storage unit 16 already stores a profile 161 that corresponds to the ongoing connection, the mobile router 1 can automatically log on to the Internet through the network transmission device 2; in other words, the user is spared the inconvenience of changing the settings manually. If, however, none of the profiles 161 stored in the storage unit 16 corresponds to the ongoing connection, the mobile router 1 can automatically create a profile 161 after the user changes the settings and successfully logs the mobile router 1 on to the Internet through the network transmission device 2. Therefore, when the mobile router 1 is again connected with this network transmission device 2, the mobile router 1 can automatically log on to the Internet through this network transmission device 2.

Figure 3A:
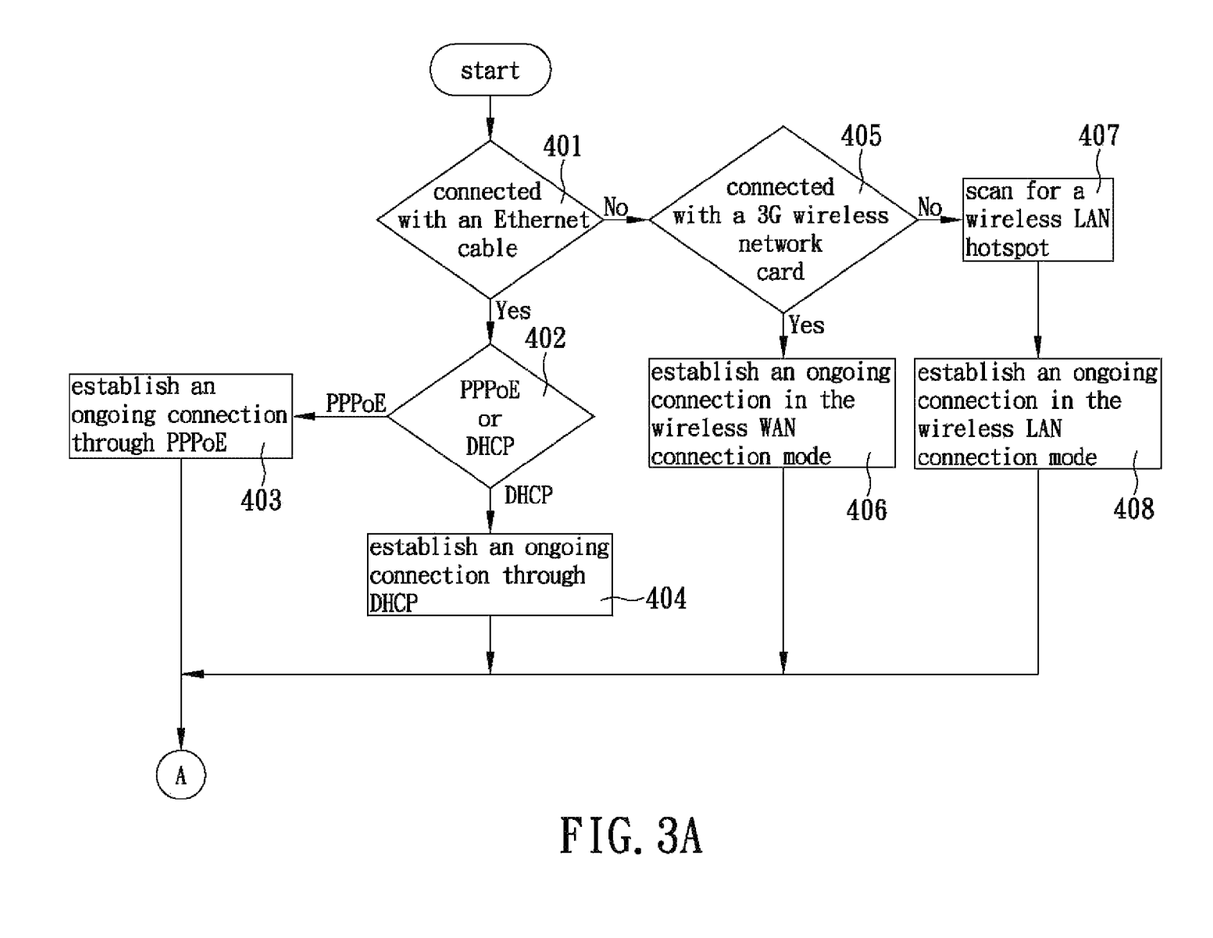
FIG. 3A and FIG. 3B are flowcharts of a method according to the present invention.
Figure 3B:
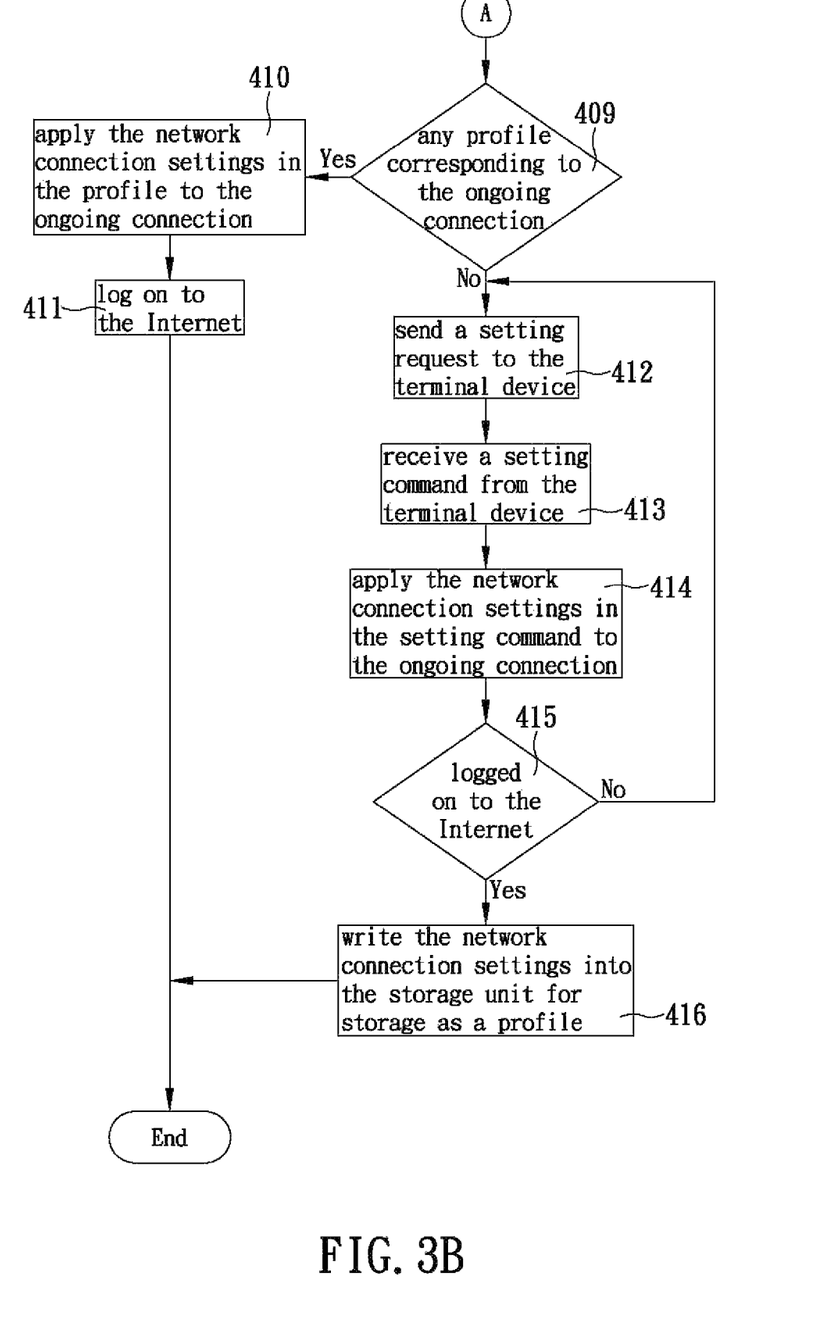

Continued from the above, the present invention also provides a method for automatically detecting a network connection mode and performing network connection setting. The method is applicable to the mobile router 1. The entire process of executing the method by the mobile router 1 can be generally divided into a frontend process and a backend process. In the frontend process, the mobile router 1 automatically detects an applicable network connection mode; in the backend process, the mobile router 1 automatically performs network connection setting (or stores a new set of network connection settings as a profile 161). To clearly disclose the method of the present invention for automatically detecting a network connection mode and performing network connection setting, a detailed description is provided below of the steps performed by the control unit 17 of the mobile router 1 when the mobile router 1 executes the method of the present invention. FIG. 3A and FIG. 3B are flowcharts of the frontend process and the backend process of the present invention respectively. Referring to FIG. 3A in conjunction with FIG. 2, in a preferred embodiment of the present invention, the frontend process of the method includes the following steps to be performed by the control unit 17:

(401) driving the detection unit 13 to detect the Ethernet cable connection port 11 and to thereby determine whether the mobile router 1 is connected with an Ethernet cable; and performing step (402) if yes and step (405) if no;

(402) driving the communication unit 14 to send a PPPoE request packet and a DHCP request packet to the network transmission device 2 (see FIG. 1); driving the protocol confirmation unit 15 to determine whether a response packet sent by the network transmission device 2 specifies the PPPoE or the DHCP; and performing step (403) if the PPPoE is specified and step (404) if the DHCP is specified;

(403) driving the communication unit 14 to establish an ongoing connection with the network transmission device 2 through the PPPoE; and then performing step (409);

(404) driving the communication unit 14 to establish an ongoing connection with the network transmission device 2 through the DHCP; and then performing step (409);

(405) driving the detection unit 13 to detect the USB connection port 12 and to thereby determine whether the mobile router 1 is connected with a wireless network interface card (e.g., a 3G wireless network card); and performing step (406) if yes and step (407) if no;

(406) driving the communication unit 14 to establish an ongoing connection with the network transmission device 2 in the wireless WAN connection mode; and then performing step (409);

(407) driving the communication unit 14 to scan for a network transmission device 2 capable of functioning as a wireless LAN hotspot; and then performing step (408); and (408) driving the communication unit 14 to establish an ongoing connection, in the wireless LAN connection mode, with the network transmission device 2 capable of functioning as a wireless LAN hotspot; and then performing step (409).

In the frontend process of the method, the control unit 17 drives the detection unit 13, the communication unit 14, and the protocol confirmation unit 15 in order to determine an applicable network connection mode between the mobile router 1 and a network transmission device 2. The control unit 17 also drives the communication unit 14 to establish an ongoing connection with the network transmission device 2.

Referring to FIG. 3B in conjunction with FIG. 2, in a preferred embodiment of the present invention, the backend process of the method includes the following steps to be performed by the control unit 17:

(409) reading the profiles 161 stored in the storage unit 16; determining whether any of the profiles 16 corresponds to the ongoing connection; and performing step (410) if yes and step (412) if no;

(410) applying the network connection settings in the profile 161 to the ongoing connection; and then performing step (411);

(411) logging the mobile router 1 on to the Internet through the network transmission device 2; and ending the method;

(412) driving the communication unit 14 to send a setting request to the terminal device 3 (see FIG. 1); and then performing step (413);

(413) receiving a setting command from the terminal device 3 through the communication unit 14; and then performing step (414);

(414) applying the new network connection settings in the setting command to the ongoing connection; and then performing (415);

(415) determining whether the mobile router 1 has successfully logged on to the Internet; and performing step (416) if yes and returning to step (412) if no; and (416) writing the new network connection settings into the storage unit 16 for storage as a profile 161; and ending the method.

In the backend process of the method, if any of the profiles 161 stored in the storage unit 16 corresponds to the ongoing connection, the control unit 17 automatically applies the network connection settings in the profile 161 to the ongoing connection, thus enabling the mobile router 1 to automatically log on to the Internet via the network transmission device 2; in other words, the user does not have to change the settings manually. If none of the profiles 161 stored in the storage unit 16 corresponds to the ongoing connection, the control unit 17 drives the communication unit 14 to send a setting request to the terminal device 3, requesting the user to set the network connection settings via the terminal device 3, and the terminal device 3 will send a set of new (i.e., changed) network connection settings to the mobile router 1 in the form of a setting command. If the mobile router 1 successfully logs on to the Internet through the network transmission device 2 after the user changes the network connection settings, the control unit 17 will automatically create a profile 161 so that, when the mobile router 1 is connected with the network transmission device 2 for a second time, the mobile router 1 can automatically log on to the Internet through the network transmission device 2. It should be pointed out that if, in this preferred embodiment, the mobile router 1 is not connected with an Ethernet cable or a wireless network interface card, the control unit 17 will drive the communication unit 14 to scan for a wireless LAN hotspot. If the communication unit 14 finds a plurality of network transmission devices 2 by scanning, the control unit 17 will check the correspondence relationship between the network transmission devices 17 and the profiles 161 and drive the communication unit 14 to connect with the network transmission device 2 that has a corresponding profile 161. That is to say, the mobile router 1 will automatically select the network transmission device 2 with which the mobile router 1 has connected before.

In conclusion, the mobile router for automatically detecting a network connection mode and performing network connection setting and a method thereof according to the present invention are so designed that a user of the mobile router neither has to frequently switch the network connection mode of the mobile router in response to a change in the networking environment, nor has to spend a lot of time and energy trying to understand the differences between various network connection modes; thus, the mobile router features increased convenience of use. Moreover, as the mobile router of the present invention can automatically record any new network connection settings as a profile, the user not only does not have to switch the network connection mode of the mobile router, but also does not have to change the network connection settings of the mobile router each time the networking environment is changed, which adds significantly to the convenience of the mobile router of the present invention.

While the invention herein disclosed has been described by means of specific embodiments, numerous modifications and variations could be made thereto by those skilled in the art without departing from the scope of the invention set forth in the claims.

What is claimed is:

1. A mobile router capable of automatically detecting a network connection mode and performing network connection setting, wherein the mobile router can connect with a network transmission device which is a wired Ethernet transmission device, a wireless Local Area Network (LAN) transmission device, or a wireless Wide Area Network (WAN) transmission device in a corresponding one of at least a network connection mode based on a wired Ethernet referred to as a wired Ethernet connection mode, a network connection mode based on a wireless LAN referred to as a wireless LAN connection mode, and a network connection mode based on a wireless WAN referred to as a wireless WAN connection mode, and wherein the mobile router can transmit a network packet from a terminal device to the Internet through a corresponding said network transmission device or from the Internet to the terminal device through a corresponding said network transmission device, the mobile router comprising:

an Ethernet cable connection port for connecting with an Ethernet cable to enable the mobile router to connect with the wired Ethernet transmission device in the wired Ethernet connection mode;

a Universal Serial Bus (USB) connection port for connecting with a wireless network interface card to enable the mobile router to connect with the wireless WAN transmission device in the wireless WAN connection mode;

a detection unit for separately detecting a connection state of the Ethernet cable connection port and of the USB connection port and determining whether the Ethernet cable or the wireless network interface card is connected to the Ethernet cable connection port or the USB connection port;

a communication unit through which the mobile router can connect, either in the wired Ethernet connection mode or the wireless WAN connection mode or directly in the wireless LAN connection mode, with a corresponding said network transmission device;

a storage unit for storing a plurality of profiles, each profile storing a set of network connection settings; and a control unit so configured that:

when the detection unit determines that the Ethernet cable is connected to the Ethernet cable connection port, the control unit drives the communication unit to connect with the wired Ethernet transmission device in the wired Ethernet connection mode;

when the detection unit determines that the Ethernet cable is not connected to the Ethernet cable connection port and that the wireless network interface card is connected to the USB connection port, the control unit drives the communication unit to connect with the wireless WAN transmission device in the wireless WAN connection mode;

when the detection unit determines that the Ethernet cable is not connected to the Ethernet cable connection port and that the wireless network interface card is not connected to the USB connection port, the control unit drives the communication unit to scan directly for the wireless LAN transmission device, which can serve as a wireless LAN hotspot, and to connect with the wireless LAN transmission device in the wireless LAN connection mode; and after the communication unit establishes an ongoing connection with a said network transmission device in a corresponding said network connection mode, the control unit reads the profiles stored in the storage unit and determines whether there is a corresponding profile corresponding to the ongoing connection, wherein if yes, the control unit applies network connection settings in the corresponding profile to the ongoing connection so as for the mobile router to log on to the Internet through the network transmission device;

if no, the control unit sends a setting request to the terminal device through the communication unit, receives a setting command from the terminal device, applies new network connection settings in the setting command to the ongoing connection, and, once the mobile router successfully logs on to the Internet through the network transmission device, writes the new network connection settings into the storage unit for storage as a profile.

2. The mobile router of claim 1, further comprising a protocol confirmation unit for receiving, via the communication unit, a response packet sent by the wired Ethernet transmission device through the Ethernet; which upon determining that the response packet confirms a network connection protocol of the wired Ethernet connection mode as requested by a request packet previously sent by the communication unit, enabling the control unit to drive the communication unit to connect with the wired Ethernet transmission device through the network connection protocol of the wired Ethernet connection mode, wherein the network connection protocol is a Point-to-Point Protocol over Ethernet (PPPoE) or a Dynamic Host Configuration Protocol (DHCP).

3. The mobile router of claim 2, wherein when the communication unit finds, by scanning, a plurality of wireless LAN transmission devices which can serve as wireless LAN hotspots, the control unit reads profiles of the wireless LAN transmission devices respectively, compares the read profiles with stored profiles in the storage unit, and drives the communication device to connect with a wireless LAN transmission device having a read profile which corresponds to a stored profile in the storage unit.

4. A method for automatically detecting a network connection mode and performing network connection setting, the method being applicable to a mobile router which can connect with a network transmission device which is a wired Ethernet transmission device, a wireless Local Area Network (LAN) transmission device, and a wireless Wide Area Network (WAN) transmission device in a corresponding one of at least a network connection mode based on a wired Ethernet referred to as a wired Ethernet connection mode, a network connection mode based on a wireless LAN referred to as a wireless LAN connection mode, and a network connection mode based on a wireless WAN referred to as a wireless WAN connection mode, and which can transmit a network packet from a terminal device to the Internet through a corresponding said network transmission device or from the Internet to the terminal device through a corresponding said network transmission device, the method comprising the steps, to be performed by the mobile router, of:

detecting an Ethernet cable connection port of the mobile router;

connecting with the wired Ethernet transmission device in the wired Ethernet connection mode upon determining that an Ethernet cable is connected to the Ethernet cable connection port;

detecting a Universal Serial Bus (USB) connection port of the mobile router upon determining that the Ethernet cable is not connected to the Ethernet cable connection port;

connecting with the wireless WAN transmission device in the wireless WAN connection mode upon determining that a wireless network interface card is connected to the USB connection port;

scanning directly for the wireless LAN transmission device, which can serve as a wireless LAN hotspot, and connecting with the wireless LAN transmission device in the wireless LAN connection mode, upon determining that the wireless network interface card is not connected to the USB connection port;

reading stored profiles stored in a storage unit of the mobile router, after an ongoing connection is established with a said network transmission device in a corresponding said network connection mode;

applying network connection settings in a corresponding profile to the ongoing connection if it is determined that the corresponding profile corresponds to the ongoing connection, so as for the mobile router to log on to the Internet through the network transmission device; and if it is determined that none of the stored profiles corresponds to the ongoing connection, sending a setting request to the terminal device, receiving a setting command from the terminal device, applying new network connection settings in the setting command to the ongoing connection, and, once the mobile router successfully logs on to the Internet through the network transmission device, writing the new network connection settings into the storage unit for storage as a new profile.

5. The method of claim 4, further comprising the steps, to be performed by the mobile router, of: sending a request packet to the wired Ethernet transmission device upon determining that the Ethernet cable is connected to the Ethernet cable connection port, wherein the request packet requests a network connection protocol of the wired Ethernet connection mode and the network connection protocol is a Point-to-Point Protocol over Ethernet (PPPoE) or a Dynamic Host Configuration Protocol (DHCP); receiving a response packet from the wired Ethernet transmission device; and enabling control unit to drive communication unit to connect with the wired Ethernet transmission device through the network connection protocol of the wired Ethernet connection mode upon determining that the response packet confirms the network connection protocol.

6. The method of claim 5, further comprising the steps, to be performed by the mobile router, of: reading respectively profiles of a plurality of wireless LAN transmission devices which can serve as wireless LAN hotspots, and comparing the read profiles with stored profiles in the storage unit, when the plurality of wireless LAN transmission devices are found by scanning; and connecting with a said wireless LAN transmission device having a profile which corresponds to a stored profile in the storage unit.

* * * * *